(12) United States Patent
Wheeler et al.

(10) Patent No.: US 11,794,663 B2
(45) Date of Patent: Oct. 24, 2023

(54) SYSTEMS AND METHODS FOR A PIEZOELECTRIC DIAPHRAGM TRANSDUCER FOR AUTOMOTIVE MICROPHONE APPLICATIONS

(71) Applicant: Ford Global Technologies, LLC, Dearborn, MI (US)

(72) Inventors: Joshua Wheeler, Trenton, MI (US); Scott Andrew Amman, Milford, MI (US); David D. Knechtges, Saline, MI (US); Ireneusz Trybula, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/658,167

(22) Filed: Apr. 6, 2022

(65) Prior Publication Data

US 2022/0227308 A1 Jul. 21, 2022

Related U.S. Application Data

(62) Division of application No. 16/879,147, filed on May 20, 2020, now Pat. No. 11,358,537.

(60) Provisional application No. 62/988,625, filed on Mar. 12, 2020, provisional application No. 62/939,979, filed on Nov. 25, 2019, provisional application No. 62/895,772, filed on Sep. 4, 2019.

(51) Int. Cl.
| | | |
|---|---|---|
| *B60R 11/02* | (2006.01) | |
| *H04R 1/02* | (2006.01) | |
| *H04R 1/04* | (2006.01) | |
| *H04R 17/10* | (2006.01) | |
| *H04R 7/04* | (2006.01) | |
| *H04R 17/02* | (2006.01) | |
| *B60R 11/00* | (2006.01) | |

(52) U.S. Cl.
CPC .......... *B60R 11/0247* (2013.01); *H04R 1/021* (2013.01); *H04R 1/04* (2013.01); *H04R 7/04* (2013.01); *H04R 17/02* (2013.01); *H04R 17/10* (2013.01); *B60R 2011/0033* (2013.01)

(58) Field of Classification Search
CPC ........ B60R 11/0247; B60R 2011/0033; H04R 1/021; H04R 1/04; H04R 7/04; H04R 17/02; H04R 17/10; H04R 2499/13; H04R 17/025
See application file for complete search history.

(56) References Cited

U.S. PATENT DOCUMENTS

2016/0059012 A1* 3/2016 Adamson ............. A61N 1/3787
607/57
2020/0322730 A1* 10/2020 Kamiya ................ G01S 15/931

FOREIGN PATENT DOCUMENTS

JP 2013029368 A * 2/2013

* cited by examiner

*Primary Examiner* — Mark Fischer
(74) *Attorney, Agent, or Firm* — Frank Lollo; Eversheds Sutherland (US) LLP

(57) ABSTRACT

Systems and methods for a transducer assembly for a vehicle having a resonating surface. The transducer assembly comprising a housing, a spacer connected to the housing, and a piezoelectric assembly disposed between the spacer and the housing. The spacer is configured to connect to the resonating surface to form an air gap between the resonating surface and the piezoelectric assembly.

7 Claims, 9 Drawing Sheets

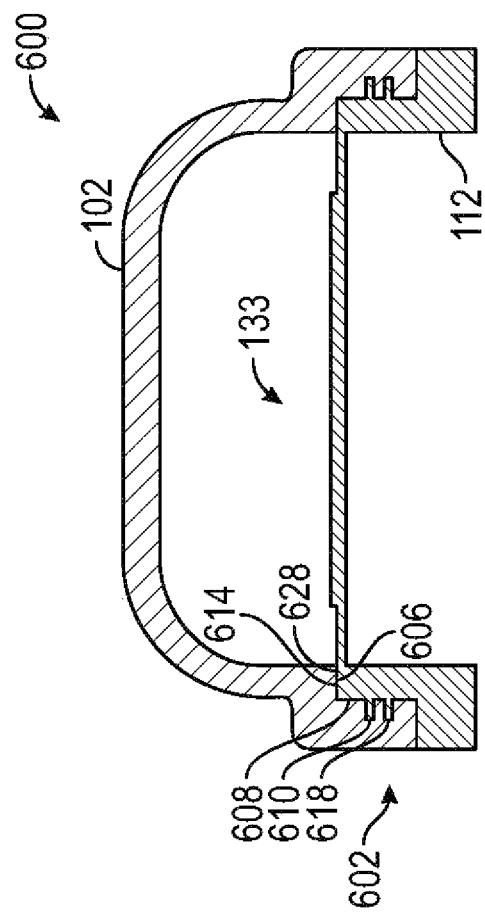
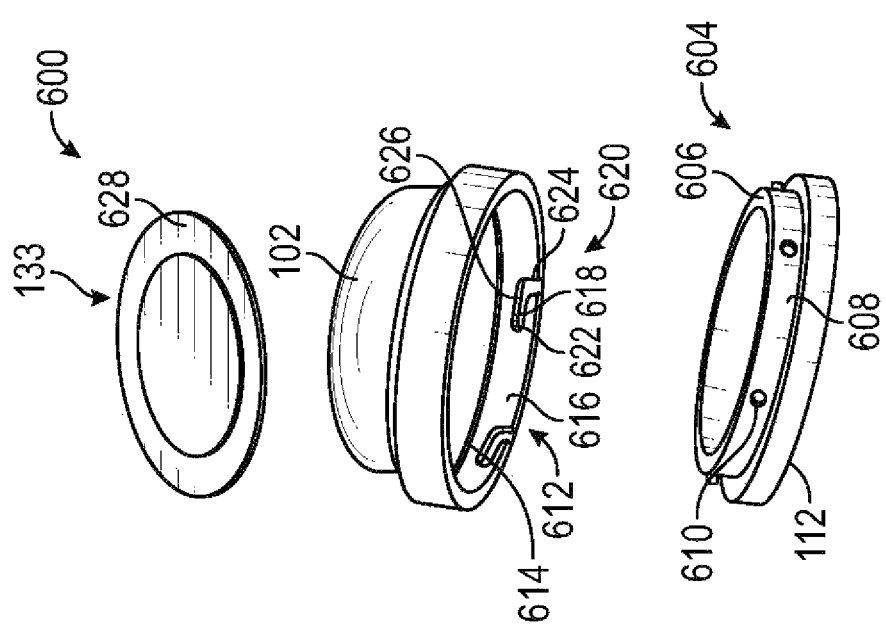
FIG. 11B
FIG. 11A

SYSTEMS AND METHODS FOR A PIEZOELECTRIC DIAPHRAGM TRANSDUCER FOR AUTOMOTIVE MICROPHONE APPLICATIONS

CROSS-REFERENCE TO RELATED APPLICATIONS

The present disclosure is a divisional of and claims priority to and the benefit of U.S. application Ser. No. 16/879,147, which claims priority to and the benefit of (i) U.S. Provisional Application No. 62/895,772, filed Sep. 4, 2019, (ii) U.S. Provisional Application No. 62/939,979, filed Nov. 25, 2019, and (iii) U.S. Provisional Application No. 62/988,625, filed Mar. 12, 2020, all of which are hereby incorporated by reference herein in their entireties.

BACKGROUND

Traditional microphones are used in automotive control systems to provide input for various automotive operations. Traditional microphones, however, may be susceptible to weather conditions when configured outside of a vehicle. More so, traditional microphones may be susceptible to environmental conditions, such as heat or cold, when configured in certain locations on a vehicle, such as in the engine compartment. Therefore, there is a need for a more robust assembly capable of functioning as a microphone for a vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 11A depicts an exploded view of a piezoelectric diaphragm transducer apparatus according to example embodiments of the present disclosure.

FIG. 11B depicts a section view of a piezoelectric diaphragm transducer apparatus according to example embodiments of the present disclosure.

DETAILED DESCRIPTION

Overview

Figure 1:
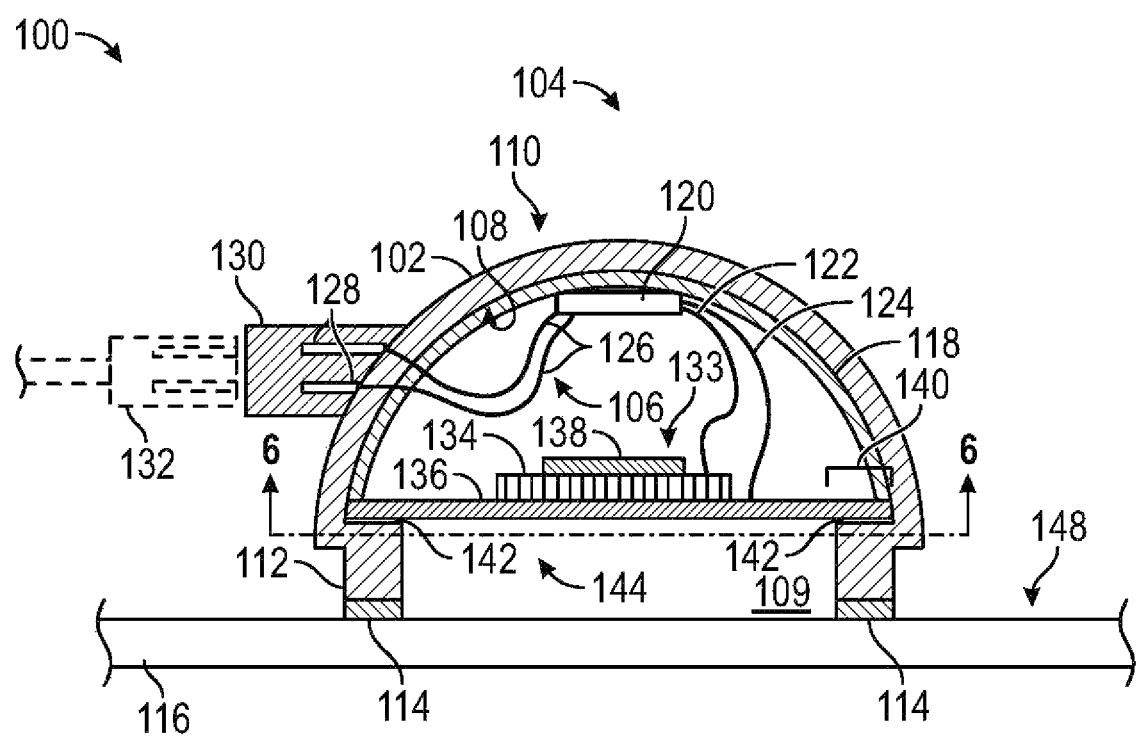
FIG. 1 depicts a piezoelectric diaphragm transducer apparatus adhered to a resonating surface according to example embodiments of the present disclosure.

Systems and methods for a transducer assembly for a vehicle having a resonating surface (such as a window or other vehicle surface) are described herein. In some instances, the transducer assembly may include a piezo crystal accelerometer configured as an input device for transforming sound related vibratory input from a rigid resonating surface of the vehicle into an electrical output. The output may include a sound signal that may be processed into a recreation of the original sound using a processing computer, such as, for example, a voice recognition system associated with an automotive computer of the vehicle. One example embodiment includes a mountable, acoustically efficient transducer assembly that can capture sound from a vehicle exterior with sound quality sufficient for voice recognition processing using the onboard computer systems, while having a relatively low noise profile associated with the signal.

The transducer assembly may be configured to act as a weather-resistant solid-state microphone device that is mountable on a vehicle interior or exterior and in locations that may normally/typically be unsuitable for microphones or other input devices, such as the engine compartment. The transducer assembly may include a piezoelectric actuator, such as the type conventionally used in small consumer electronics to produce beeps, chirps, or other sound output. The piezoelectric actuator may be configured as an input device, where the transducer assembly is rigidly mountable to the resonating surface, such as an automobile window, and uses the window to receive sound vibrations and produce a sound signal for processing by the automotive computer.

In some instances, the transducer assembly may include a small cavity between the piezoelectric device and the glass surface upon which the transducer assembly is mounted. The air gap formed by the cavity may receive kinetic movements caused by sound resonating through the glass. The piezoelectric element may receive these kinetic (in some instances minute) movements via the air gap between the piezoelectric element and the resonating glass surface, such that the piezoelectric element may move freely responsive to the kinetic movements. The piezoelectric element may sense vibration associated with sound (e.g., a person speaking, a dog barking, an engine noise, a street noise, etc.), as the sound resonates through the mounting surface (e.g., the automotive glass) and moves the piezoelectric element, which produces a signal output without interference from a contacting surface that spans across the entire bottom of the piezoelectric element.

In this manner, the piezoelectric element may be disposed on a flexible diaphragm suspended just above the air gap by way of a connecting surface (such as a spacer) that extends around a periphery of the flexible diaphragm. The rigid piezoelectric disk portion may receive the air pressure differential forces from the physical manifestation of sound as it propagates through the resonant surface. The piezoelectric element may generate an electrical impulse, which may be conditioned by way of bandpass filters and amplification circuits. The outputs may include a conditioned electric sound signal that may be usable by processing computers onboard the vehicle.

The transducer assembly may be electrically passive, such that it is mountable to an exterior vehicle surface and generates a low voltage signal having negligible electromagnetic interference that would otherwise distort or interrupt a sound output signal. For example, the transducer assembly may include electromagnetic shielding in the assembly housing that is configured to shield the low-voltage signals from crosstalk between the device and other electromagnetic forces.

The systems and methods described hereafter may provide a weather-resistant and robust sound input apparatus for delivering high-quality sound output signals that mimic a microphone, while using a robust and inexpensive package of solid-state components. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts a transducer assembly 100 according to example embodiments of the present disclosure. The transducer assembly 100 may include a transducer housing 102 and an annular spacer 112 configured to rigidly connect with a resonating surface 116 by way of an adhesive layer 114 at the base of the annular spacer 112. The transducer assembly 100 may further include a flexible diaphragm 136 that divides an interior portion 106 from a cavity 109 formed by the annular spacer 112 when the annular spacer 112 is rigidly disposed in connection with an exterior portion 148 of the resonating surface 116. The flexible diaphragm 136 may therefore be suspended above the resonating surface 116 such that an air gap 144 is formed between the flexible diaphragm 136 and the resonating surface 116. Although depicted as generally dome-shaped, it is possible that the housing and general shape of the transducer assembly 100 may be configured as generally rectangular, ovaloid, or another suitable shape.

In one embodiment, a piezoelectric disk assembly 133 may include the flexible diaphragm 136 and a piezoelectric disk portion 134. The piezoelectric disk portion 134 may be rigidly disposed on an interior-facing side of the flexible diaphragm 136 (e.g., on the interior portion 106 side of the flexible diaphragm 136). The piezoelectric disk assembly 133 may further include a tunable mass 138 disposed on a top surface of the piezoelectric disk portion 134. The tunable mass 138 may rigidly connect with the top surface of the piezoelectric disk portion 134 and be sized to a mass that can provide vibrational enhancement to the piezoelectric disk portion 134. In some instances, the tunable mass 138 may be configured to accentuate movement caused by sound resonating through the resonating surface and through the annular spacer 112 to the flexible diaphragm 136.

Those skilled in the art will appreciate that a tunable mass may be sized, shaped, and oriented within a transducer assembly, where the size, shape, and orientation are based on experimental observation of how these characteristics may affect the system response. The orientation, shape, size, substrate material, density, and fastening means of the tunable mass may be selected so as to enhance vibratory components of the movable member in the transducer assembly 100 by increasing an amplitude of the signal output by the piezoelectric disk portion 134 (and the transducer assembly 100 in general).

The transducer assembly 100 may further include an electromagnetic field (EMF) shield layer 118 disposed on a housing interior surface 108 such that the interior portion 106 has electromagnetic separation from an exterior portion 104 of the transducer assembly 100 and the interior portion 106. The EMF shield layer may include and/or be constructed of conductive or magnetic materials that can electrically isolate a printed circuit board (PCB) 120, connecting wires 122, 124, and 126, and the piezoelectric disk portion 134 from radio frequency electromagnetic radiation. For example, the EMF shield layer 118 may be constructed of sheet metal, metal foil, metallic ink, magnetic material, or another suitable material.

In some instances, the housing 102 and the EMG shield layer 118 may be integrated as a single unit where the EMF shield layer 118 is over-molded as an insert during an injection mold operation. In other instances, the EMG shield layer 118 may be adhered to the housing interior surface 108 using fastening means that provide a rigid connection between the EMF shield layer 118 and the housing 102. The EMF shield layer and the housing 102 may be, alternatively, integrated as the same part such that the EMF shielding 118 is an additive component of the thermoplastic used to mold the housing 102 (e.g., a magnetic or metallic powder, etc.). The EMG shield layer 118 may reduce and/or substantially remove the coupling of radio waves, electromagnetic fields, and/or electrostatic fields to the signal output of the PCB 120.

The printed circuit board (PCB) 120 of the transducer assembly 100 may be configured to include one or more signal conditioning circuits that remove signal content that could interfere with output processing. The one or more signal conditioning circuits may also be configured to amplify signal output voltages for transmission to an automotive computer or the like. An example circuit for the PCB 120 is discussed below with reference to FIG. 5.

Figure 2:
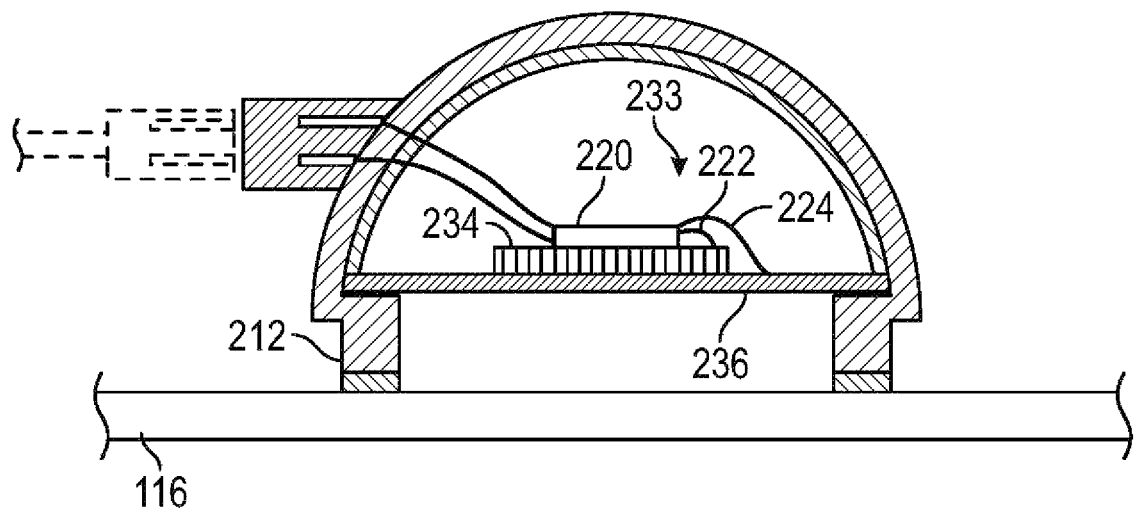
FIG. 2 depicts a piezoelectric diaphragm transducer apparatus adhered to a resonating surface having a printed circuit board (PCB) configured as a tunable mass according to example embodiments of the present disclosure.
Figure 3:
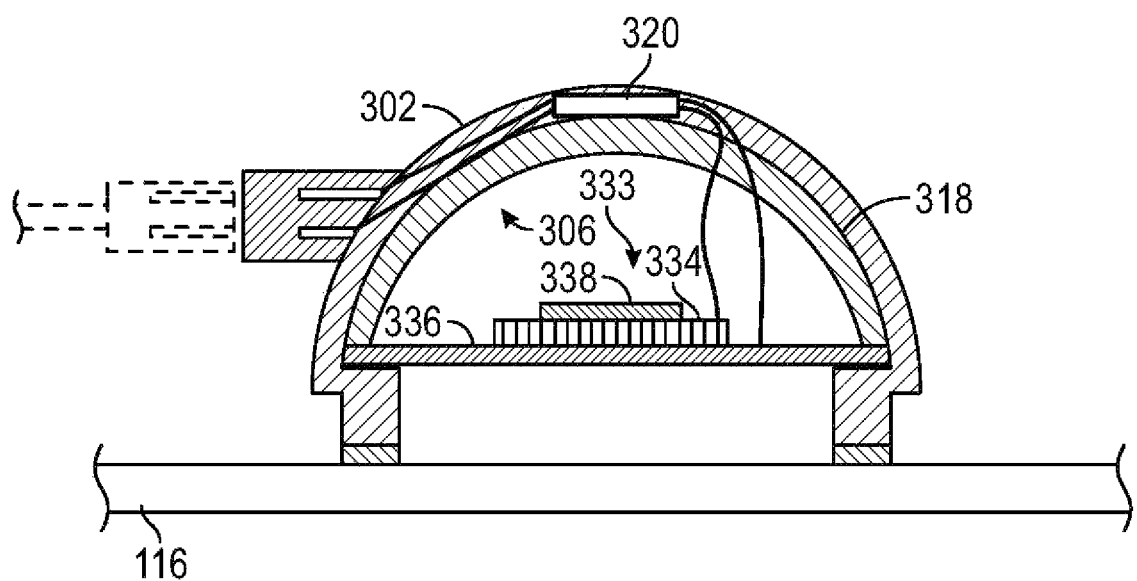
FIG. 3 depicts a piezoelectric diaphragm transducer apparatus adhered to a resonating surface having a PCB integrated within a housing wall of the apparatus according to example embodiments of the present disclosure.

Various configurations for placement of the PCB 120 are discussed in FIGS. 1-4, which may provide various benefits, including simplification of the assembly, cost reduction, and longevity of the apparatus when used in the field. For example, FIG. 1 depicts the PCB 120 disposed on the interior portion 106 side of the EMF shield layer 118. In FIG. 2, a PCB 220 is shown disposed on a top surface of a piezoelectric disk portion 234 (in place of the tunable mass, where the PCB 220 is weighted according to the particular application to function also as the tunable mass). In FIG. 3, a PCB 320 is integrated into a housing 302 of a transducer assembly 300, where the housing 302 may include EMF shielding material as an additive molding component and/or where the PCB 320 is sandwiched between the housing 302 and an EMF shield layer 318. In FIG. 4, a PCB 420 may be insert molded into an EMF shield layer 418, where the EMF shield layer 418 is a separate layer that is rigidly disposed in connection with a housing 402.

Although the advantages for these various configurations are discussed in greater detail in FIGS. 2, 3, and 4, respectively, it should be appreciated that in all examples, the PCB may be disposed in communication with an automotive computer or the like by way of a wiring harness 130 or the like, as depicted in FIG. 1. For example, the wiring harness 130 may be connectible with the automotive computer. In some instances, the wiring harness 130 may include and/or be a pigtail-less, male, two-pin connector to prevent loose wiring from a pigtail that has the potential to vibrate against adjacent members during vehicle motion. Mechanical contact can be perceived as structure-borne sound and may overload the output signal transmitted from the transducer assembly 100 via the pigtail. Accordingly, the wiring harness 130 may include harness terminals 128 for removably connecting the connector 132 and electrically connecting the PCB 120 with the automotive computer. The harness terminals 128 may connect with the PCB 120 via the connecting wires 126. The PCB 120 may receive sensor data from the piezoelectric disk assembly 133 by way of the connecting wires 122 and 124.

The transducer assembly 100 is configured such that the annular spacer 112 creates the air gap 144 between the piezoelectric disk assembly 133 and the resonating surface 116. The annular spacer 112 may be a generally cylindrical spacing ring that can be constructed from a rigid material having relatively low damping characteristics, such as, for example, a rigid polymer, a rigid polymer having a fiber, glass, or other additive, metal, or other suitable material, that allows efficient vibration transfer from the resonating surface 116 to reach the piezoelectric disk assembly 133. Using softer materials for the annular spacer 112 may attenuate the structure-borne vibration signal and reduce the electrical output and increase noise. The annular spacer may space the assembly housing 102 and flexible diaphragm 136 apart from the mounting surface (e.g., the automotive glass, represented by the resonating surface 116) by creating the air gap between the glass (e.g., resonating surface 116) and the piezoelectric disk portion 134.

The flexible diaphragm 136 may be constructed of an elastically deformable material, such as, for example, copper, nickel alloy, or another suitable material. In one aspect, portions of the piezoelectric disk assembly 133 may be a commercially available device, such as a piezoelectric diaphragm that may be used commercially as a sound output device for electronics, such as clocks, calculators, digital cameras, alarm systems, etc. For example, the flexible diaphragm 136, the piezoelectric disk portion 134, and the connecting wires 122 and 124 may be commercially available and inexpensive piezoelectric diaphragm sound devices that are frequently used for sound generation in electronics.

The piezoelectric disk assembly 133 may be configured above the resonating surface 116 with the air gap 144 separating the diaphragm from the resonating surface 116. By mounting the piezoelectric disk assembly 133 to the annular spacer 112 at a rigidly connected annular edge 140, a rigid connection surface 142 may form part of the enclosed air gap 144 that increases the sensitivity of the piezoelectric disk portion 134 as it responds to kinetic input (e.g., vibration with sound) resonating through the resonating surface 116.

In some instances, the piezoelectric disk assembly 133 may include a commercially available piezoelectric sound component rigidly fixed to the annular spacer 112 with fastening means, such as, for example, a double-sided adhesive layer, epoxy, or a mechanical connection by way of a press fit between the rigid connection surface 142 and an annular bottom edge of the EMF shield layer 118.

The annular spacer 112 may be separate from the housing 102. That is, the annular spacer 112 may connect to the housing 102 using a snap fit feature that rigidly fastens the annular spacer 112 to the housing 102 such that the piezoelectric disk assembly 133 is sandwiched between the two mating parts. Other means for connection are possible and are contemplated. Regardless of the method of connecting the annular spacer 112, the housing 102, and the piezoelectric disk assembly 133, it should be appreciated that the connecting means provide the rigid connecting surface 142 at a periphery of the flexible diaphragm 136 at an outer edge, such that the diaphragm 136 is distanced from the mounting surface of the resonating surface 116. These features may create the secure connections for transmitting vibratory signals to the piezoelectric disk portion 134, with enhanced sensitivity by way of the air pressure differential associated with the vibrations acting on the air gap 144. In some instances, the housing and the spacer may be a single unitary component.

The adhesive layer 114 and the rigid connection surface 142 (which may also be an adhesive layer) may provide rigid connection between the flexible diaphragm 136, the annular spacer 112, and the resonating surface 116. The adhesive layer 114 (and in some embodiments, the rigid connecting surface 142) may include fastening means, such as, for example, a commercially known permanent double-sided adhesive material, an epoxy bonding agent, a fastener (e.g., screws/bolts) or another means for providing the rigid connection between the flexible diaphragm 136, the annular spacer 112, and the resonating surface 116.

The bottom portion of the transducer assembly 100 may be mounted to the resonating surface 116 (which may be, in some embodiments, automotive window glass). It should be appreciated that sensitivity and longevity of the transducer assembly 100 may be enhanced by a corresponding shape or indention in the resonating surface 116 such that a cup-shaped dish within the glass surface provides a receiving surface upon which the transducer assembly 100 may be mounted. For example, the mounting surface may be shaped like a flat circular donut or ring.

The PCB 120 may provide band pass filtering via one or more bypass filters and signal amplification via one or more amplification circuits that can filter the signal output and enhance desired frequencies centered on the human voice (e.g., about 150 Hz to about 8 kHz). The PCB 120 may also provide high pass filtering that can reduce the influence of any rigid body motion or vibration associated with vehicle movement by reducing the dynamic range of the structure-borne signal. The PCB 120 may include one or more op-amps that increase the voltage output of the transducer assembly 100, powered by a phantom voltage charge (similar to those used on traditional ECM microphone circuits), which may increase the signal strength before it travels down through the wiring harness 130 to an automatic speech recognition system associated with an automotive computer.

The wiring harness 130 may be integrated with the housing 102 such that the harness and the housing 102 are molded as a single unit, having insert molded harness terminals 128 wired in connection with the PCB 120. In another example, the PCB 120 may connect with the wiring harness 130 and the harness terminals 128 by way of the connecting wires 126 that extend through openings in the housing 102 for the wires to pass through to the exterior surface 110 and connect with the harness terminals 128. In such instances, the wiring harness 130 may be a separate component rigidly fastened to the exterior surface 110 of the housing 102 using fastening means, such as an adhesive, plastic welding, mechanical fasteners, or other suitable means.

The connector 132 may provide connection between the PCB 120 and the automotive computer. In some instances, the piezoelectric diaphragm transducer assembly 100 may be configured to have a low profile and small package size such that it may be discretely packaged at an edge of an automotive window glass, behind door trim of the automobile, or in another area such that the transducer is completely out of view of the customer. The package may take a low profile (e.g., no more than 20 mm high) and may be configured to include sufficient clearance between the exterior surface 110 of the transducer assembly 100 and any adjacent components of the automobile. Example clearance may be, for example, at least 5 to 10 mm clearance from any surrounding door trim or other component when installed to provide adequate protection from vibratory signal noise and to provide protection from unintended structure-borne noises that may pollute the window microphone signal.

FIG. 2 depicts another example piezoelectric diaphragm transducer 200 adhered to the resonating surface 116. Except where expressly described in the following paragraphs, the transducer assembly 200 may be substantially similar or identical to the transducer assembly 100 as shown in FIG. 1. For example, the transducer assembly 200, as shown in FIG. 2, may differ from the assembly 100 of FIG. 1 in that a piezoelectric disk assembly 233 may be comprised of a piezoelectric disk portion 234, a flexible diaphragm 236, and the PCB 220, of which the piezoelectric disk portion 234 and the PCB 220 are rigidly connected to a top surface of the flexible diaphragm 236. The flexible diaphragm 236 may be substantially similar or identical to the flexible diaphragm 136 described with respect to FIG. 1. The piezoelectric disk portion 234 may also be substantially similar or identical to the piezoelectric disk portion 134 of FIG. 1.

The transducer assembly 200 may configure the PCB 220 to additionally function as a tunable mass (where the tunable mass 138 as shown in FIG. 1 is omitted, via weighting the PCB 220 to function as the mass in addition to a signal conditioning unit). In one aspect, the PCB 220 may be weighted by varying a size, thickness, material, or other characteristic, such that the PCB package size, when disposed within the piezoelectric disk assembly 233, mimics the size and mass distribution of the tunable mass as described in FIG. 1. Accordingly, the PCB 220 may be disposed on and rigidly connect with the piezoelectric disk portion 234. A connecting wire 222 and a connecting wire 224 may connect the PCB 220 with a respective one of the piezoelectric disk portion 234 and the flexible diaphragm 236.

The configuration depicted in FIG. 2 may provide several advantages, including a reduction of the number of parts in the transducer assembly 200, which may reduce manufacturing costs, simplify design complexity, and increase part longevity and functional reliability. In other aspects, by integrating the PCB and the tunable mass into a single unit that moves with the piezoelectric disk assembly 233, the transducer assembly 200 may experience reduced signal noise from external vibrations, because the PCB is decoupled from the housing except through the flexible diaphragm 236.

FIG. 3 depicts another example piezoelectric diaphragm transducer apparatus (hereafter "transducer assembly 300") adhered to the resonating surface 116. Except where expressly described in the following paragraphs, the transducer assembly 300 may be substantially similar or identical to the transducer assembly 100 as shown in FIG. 1. For example, the transducer assembly 300 as shown in FIG. 3 may differ from the assembly 100 of FIG. 1 in that a piezoelectric disk assembly 333 may include a piezoelectric disk portion 334, a flexible diaphragm 336, and a tunable mass 338. However, in the example embodiment of FIG. 3, a PCB 320 may be included as an integrated part of a housing 302. In FIG. 3, an EMF shield layer 318 is depicted. The EMF shield layer 318 may be separate from (and rigidly connected with) the assembly housing 302, or alternatively, may be integrated with the housing 302 such that the EMF shield layer 318 is provided as a property of a molding additive and not a separate part distinct from the housing 302. In this example, the housing 302 may be constructed of a thermoplastic having electromagnetic shielding properties.

In another aspect, the PCB 320 may be sandwiched between the EMF shield layer 318 and the housing 302. This example configuration may provide EMF shielding properties that protect the PCB 320 from EMF external vibrations originating from the exterior surface side of the transducer assembly 300 and may also protect the PCB 320 from EMF originating from the interior portion 306 side of the transducer assembly 300. For example, EMF vibrations could originate from inside of the vehicle through the resonating surface 116 (which may be glass).

The flexible diaphragm 336 may be substantially similar or identical to the flexible diaphragm 136 described with respect to FIG. 1. The piezoelectric disk portion 334 may also be substantially similar or identical to the piezoelectric disk portion 134 of FIG. 1.

The configuration depicted in FIG. 3 may provide several advantages, including a reduction in parts that are movable in the assembly (which may reduce unwanted signal content caused by movement of the components). Other possible advantages may include a reduction of manufacturing costs associated with removing design complexity and an increase in part longevity in the field. In other aspects, by integrating the PCB to be integral with the housing 302, the transducer assembly 300 may further enhance signal sensitivity and reduced signal noise from vibrations, because the PCB is integrated with the housing 302 without the need for connecting means and the possibility of micro-movements associated with physical connection of separate members.

Figure 4A:
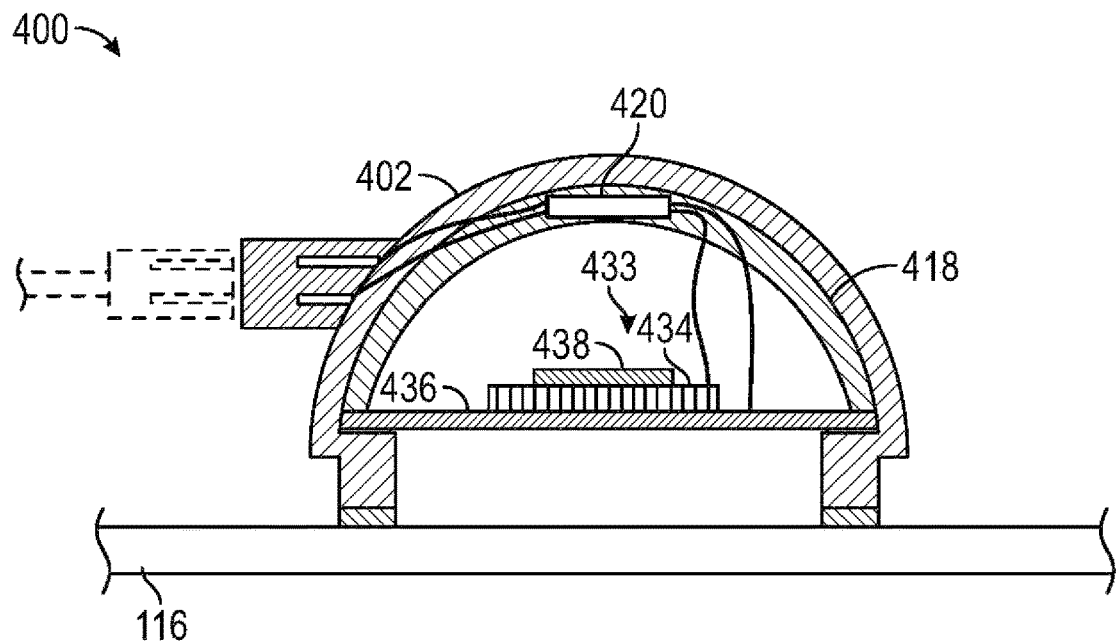
FIG. 4A depicts a piezoelectric diaphragm transducer apparatus adhered to a resonating surface, where the piezoelectric transducer apparatus includes a PCB integrated within an electrically shielded housing wall of the apparatus according to example embodiments of the present disclosure.

FIG. 4A depicts another example piezoelectric diaphragm transducer apparatus (hereafter "transducer assembly 400"), where the transducer assembly 400 includes a PCB 420 integrated within an electrically shielded wall of an EMF shield layer 418. Except where expressly described in the following paragraphs, the transducer assembly 400 may be substantially similar or identical to the transducer assembly 100 as shown in FIG. 1. For example, the transducer assembly 400 as shown in FIG. 4A may differ from the assembly 100 of FIG. 1 in that a piezoelectric disk assembly 433 may include a piezoelectric disk portion 434, a flexible diaphragm 436, and a tunable mass 438.

The flexible diaphragm 436 may be substantially similar or identical to the flexible diaphragm 136 described with respect to FIG. 1. The piezoelectric disk portion 434 may also be substantially similar or identical to the piezoelectric disk portion 134 of FIG. 1.

In one aspect, the PCB 420 may be insert molded with the EMF shield layer 418, and the EMF shield layer 418 may be rigidly disposed in connection with the housing 402.

The configuration depicted in FIG. 4A may provide several advantages, including a reduction of connecting parts in the assembly, which may reduce manufacturing costs and may provide a reduction in design complexity. Fewer connected parts could also increase part longevity and functional reliability. In other aspects, by integrating the PCB 420 with the housing 402 and/or the EMF shield layer 418, the transducer assembly 400 may enhance signal sensitivity and achieve reduced signal noise from vibrations, because the PCB is integrated with the housing 402 and/or the shield layer 418, without the need for connecting means and the possibility of micro-movements associated with physical connection of separate members.

Figure 4B:
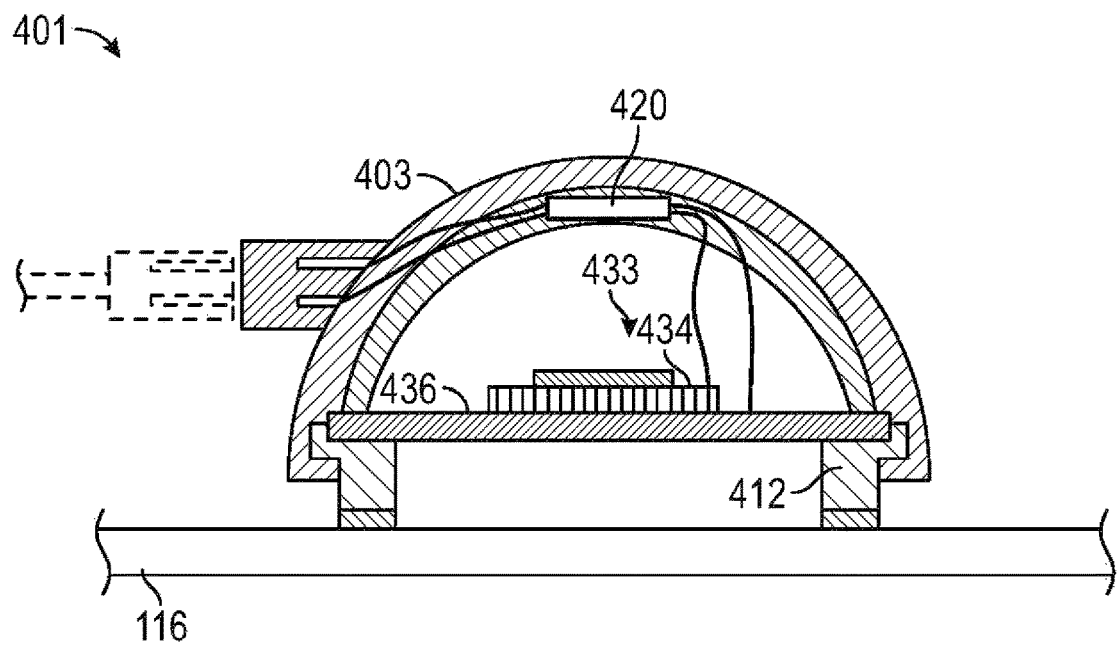
FIG. 4B depicts a piezoelectric diaphragm transducer apparatus adhered to a resonating surface, where the piezoelectric transducer apparatus includes a two-piece housing and annular ring configuration according to example embodiments of the present disclosure.

FIG. 4B depicts another example piezoelectric diaphragm transducer apparatus (hereafter "transducer assembly 401"), where a housing 403 is disposed rigidly connected with a separate annular ring 412 such that the flexible diaphragm 436 is rigidly sandwiched between the two connected pieces. Although the transducer assembly 401 is depicted with the PCB 420 integrated within an electrically shielded wall of an EMF shield layer 418, it is possible to apply the two-piece housing and annular ring configuration of FIG. 4B to any of the configurations described with respect to FIGS. 1-4A.

Except where expressly described in the following paragraphs, the transducer assembly 400 may be substantially similar or identical to the transducer assembly 100 as shown in FIG. 1. For example, the transducer assembly 401 as shown in FIG. 4B may differ from the assembly 100 of FIG. 1 in that the housing 403 is configured to rigidly connect with an annular ring 412, which may be a separate part from the housing 403, by fastening means, such as, for example, a snap fit with undercut snap features, a press fit, adhesive bonding, fasteners (e.g., screws/bolts) or another fastening means.

The configuration depicted in FIG. 4B may provide several advantages including ease of assembly of the transducer assembly 401, which may reduce manufacturing costs and may provide a reduction in design complexity. In other aspects, by rigidly connecting the housing 403 with the annular spacer 412 as two separate pieces that rigidly sandwich the flexible diaphragm 436 between the members, a conventional piezoelectric diaphragm may be transformed from a sound output device into an input device as described herein.

Figure 5:
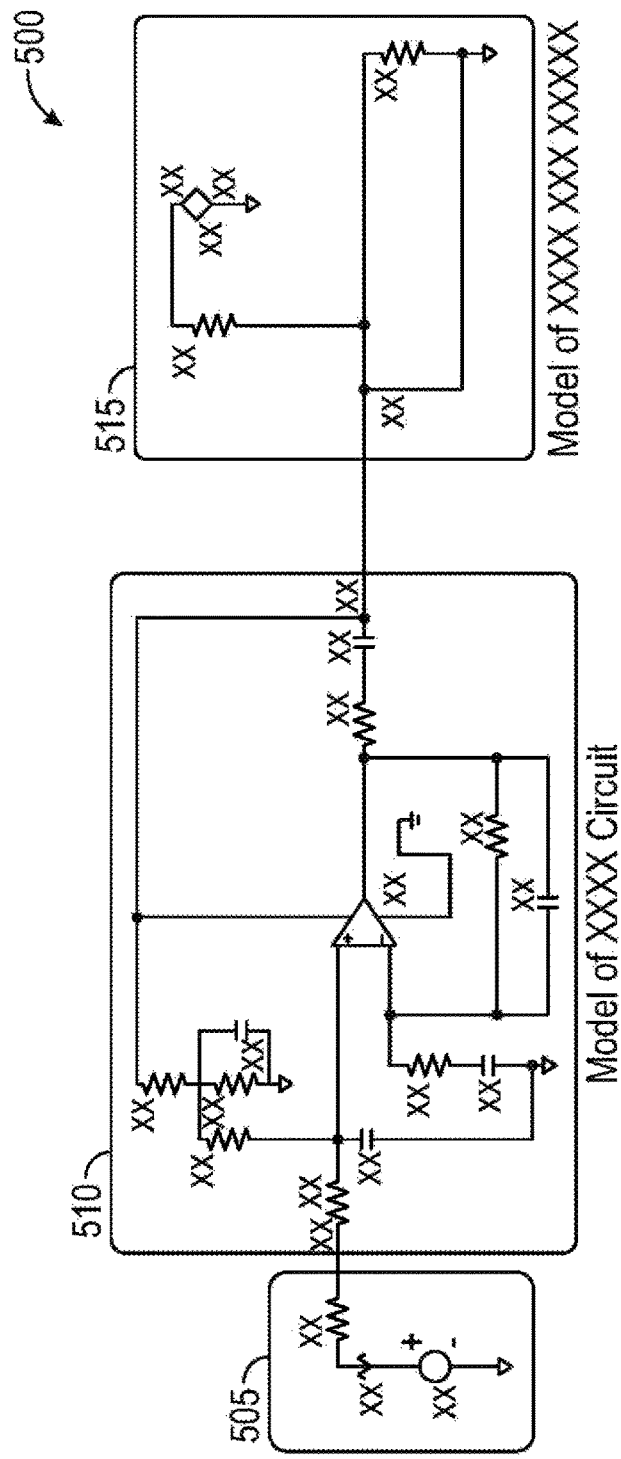
FIG. 5 schematically depicts an example PCB circuit for any one of the apparatuses depicted in FIGS. 1-4B according to example embodiments of the present disclosure.

FIG. 5 schematically depicts an example PCB circuit 500 for use with any one of the apparatuses depicted in FIGS. 1-4B. The PCB circuit 500 can include a disc element circuit 505 and a preamp circuit 510. In one example, the circuit 500 may include a preamp circuit and bandpass filter. The bandpass filter may provide an output signal having content between 150 Hz to 8 kHz and omit other signal content. The op-amp may increase output voltage such that the circuit 500 may provide a signal to a microphone input circuit 515 having sufficient amplitude to support a clear and unambiguous output that may be used for voice recognition.

Figure 6:
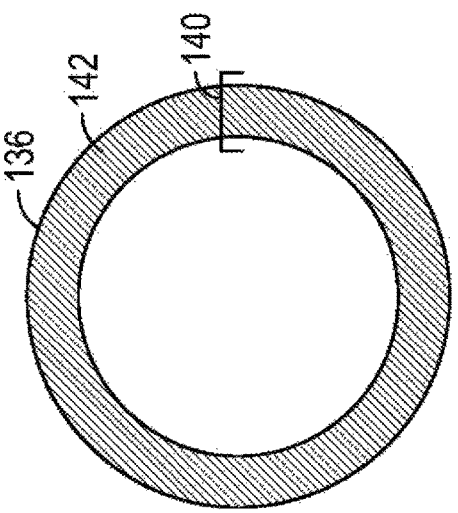
FIG. 6 is a view of a rigid connection surface for a flexible diaphragm portion of the apparatus according to example embodiments of the present disclosure.

FIG. 6 is an overhead view 6-6 (as noted by the arrows 6-6 in FIG. 1) of the flexible diaphragm 136. View 6-6 depicts the rigid connection surface disposed about a peripheral edge of the diaphragm 136 (that mates with the rigidly connected annular edge 140). By connecting the flexible diaphragm 136 at the edges only with a secure connecting means that positively transmits vibration to the flexible diaphragm 136, the connection footprint leaves ample interior space that allows the flexible diaphragm 136 to flex from the air pressure differential created by micro-vibrations through the resonating surface 116.

FIGS. 11A and 11B depict a piezoelectric diaphragm transducer apparatus 600, according to example embodiments of the present disclosure. Except where expressly described in the following paragraphs, the transducer assembly 600 may be substantially similar or identical to the transducer assembly 100 as shown in FIG. 1. In the transducer assembly 600 as shown in FIGS. 11A and 11B, the housing 102 may be connected to the annular spacer 112 via an attachment assembly 602. In some instances, the attachment assembly 602 may not require adhesives to hold the piezoelectric disk assembly 133 between the housing 102 and the annular spacer 112. Adhesives may cause damping and lessens the vibration transfer from the glass to the piezoelectric disk assembly 133. Thus, the lack of adhesives may provide the technical advantage of increased functionality and accuracy of the piezoelectric diaphragm transducer apparatus 600.

The annular spacer 112 may include a slot 604. In some instances, the slot 604 may be annular. For example, the slot 604 may extend around the circumference of the annular base 112. The slot 604 may be any suitable sized, shape, or configuration. The slot 604 may include a ledge 606 and a wall 608. In some instances, the ledge 606 and the wall 608 may be transverse to each other. The ledge 606 and the wall 608 may be any suitable size, shape, or configuration. One or more protrusions 610 may extend from the wall 608. The protrusions 610 may be any suitable size, shape, or configuration.

The housing 102 may include a groove 612. In some instances, the groove 612 may be annular. For example, the groove 612 may extend around an inner circumference of the housing 102. The groove 612 may be any suitable size, shape, or configuration. The groove 612 may include a ledge 614 and a wall 616. In some instances, the ledge 614 and the wall 616 may be transverse to each other. The ledge 614 and the wall 616 may be any suitable size, shape, or configuration. One or more channels 618 may be disposed within the wall 616. The channels 618 may include an open end 620 and a closed end 622. In some instances, the channels 618 may include a first portion 624 and a second portion 626, which is traverse from the first portion 624. That is, the channels 618 may be L-shaped or the like. The channels 618 may be any suitable size, shape, or configuration.

The slot 604 of the annular spacer 112 and the groove 612 of the housing 102 may be configured to mate with each other. That is, the slot 604 and groove 612 may complement each other. In this manner, the protrusions 610 may be configured to mate with the channels 618. For example, a protrusion 610 may pass into a channel 618 through the open end 620 of the channel 618 and move along the first portion 624 of the channel 618 when the housing 102 is pressed against the annular spacer 112. Next, as the housing 102 is rotated, the protrusion 610 may travel along the second portion 626 of the channel 618. In some instances, the second portion 626 of the channel 618 may be angled (e.g., as slight incline) such that the housing 102 is tightened against the annular spacer 112 as the housing 102 is rotated onto the annular spacer 112. For example, the second portion 626 of the channel 618 may be angled away from the annular spacer 112. In this manner, the protrusion 610 may travel along the second portion 626 of the channel 618, which may cause the protrusion 610 to apply greater and greater force against the second portion 626 of the channel 618 as the protrusion 610 travels further up and into the second portion 626 of the channel 618.

The piezoelectric disk assembly 133 may be disposed between the housing 102 and the annular spacer 112. For example, an outer edge 628 of the piezoelectric disk assembly 133 may be sandwiched (i.e., trapped) between the ledge 606 of the annular spacer 112 and the ledge 614 of the housing 102. In this manner, the piezoelectric disk assembly 133 may be secured in place without the use of adhesives.

Figure 7:
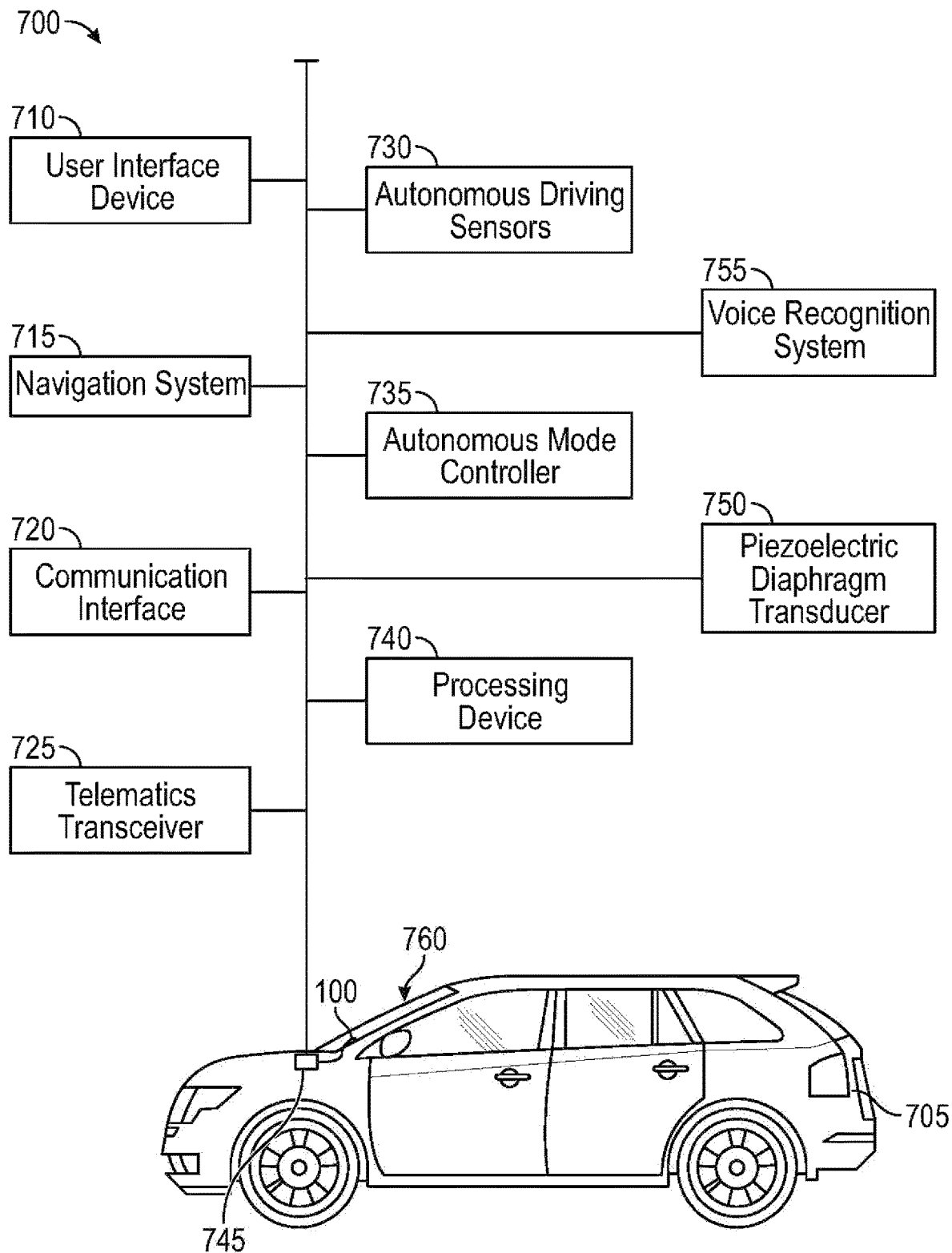
FIG. 7 is a schematic of an example vehicle control system configured to receive a sound input signal from the apparatus(es) depicted in any one of FIGS. 1-5 in accordance with the present disclosure.

FIG. 7 depicts a schematic of an example vehicle control system 700 configured to receive a sound input signal from a transducer assembly 745. The transducer assembly 745 may be substantially similar or identical to any of the transducer assemblies 100, 200, 300, or 400, as described with respect to corresponding FIGS. 1-4B). Although described hereafter as an autonomous vehicle, the control system 700 that may be configured for use in a vehicle 705, which may be an autonomous vehicle, a semi-autonomous vehicle, or a conventionally driven vehicle. The control system 700 can include a user interface 710, a navigation system 715, a communication interface 720, autonomous driving sensors 730, an autonomous mode controller 735, and one or more processing device(s) 740. The control system 700 may further include a voice recognition system 755. The transducer assembly 745 may provide input signals to the voice recognition system 755, which may be configured to interpret the input signals to a contextualized voice input. In one embodiment, the control system 700 may perform one or more vehicle actions based on the input, such as starting a drive motor, stopping the vehicle, performing steering or braking actions, or other vehicle operations.

The user interface 710 may be configured or programmed to present information to a user during operation of the vehicle 705. In one aspect, the user interface may provide auditory output of the signal received from the transducer assembly 745. Moreover, the user interface 710 may be configured or programmed to receive user inputs, and thus, it may be disposed in or on the vehicle 705 such that it may be viewable, audible, or interactive by a passenger or operator. For example, in one embodiment where the vehicle 705 is a passenger vehicle, the user interface 710 may be located in the passenger compartment.

The navigation system 715 may be configured and/or programmed to determine a position of the autonomous vehicle 705. The navigation system 715 may include a Global Positioning System (GPS) receiver configured or programmed to triangulate the position of the AV 705 relative to satellites or terrestrial based transmitter towers. The navigation system 715, therefore, may be configured or programmed for wireless communication. The navigation system 715 may be further configured or programmed to develop routes from a current location to a selected destination, as well as display a map and present driving directions to the selected destination via, e.g., the user interface 710. In some instances, the navigation system 715 may develop the route according to a user preference. Examples of user preferences may include maximizing fuel efficiency, reducing travel time, travelling the shortest distance, or the like.

In one aspect, the vehicle control system 700 may be configured to receive audio data from the piezoelectric diaphragm transducer 750 (hereafter "transducer 750") and perform one or more vehicle operations based on the audio data. For example, the vehicle control system 700 (hereafter "control system 700") may receive the audio data, where the data includes one or more engine or motor sounds indicative of an automotive maintenance issue that requires imminent attention or servicing. Accordingly, the control system 700 may receive the audio data, compare the audio data to a database of audio sounds correlated with automotive maintenance indications, and determine based on a match of the audio data to a maintenance indication, that the vehicle requires imminent maintenance. Responsive to determining that the vehicle requires imminent maintenance, the control system 700 may control the autonomous mode controller 735 to navigate to a service location or other safe location such that the maintenance issue can be addressed. In one aspect, the control system 700 may obtain information from the navigation system 715 and navigate the vehicle 705 to the service location based on the GPS information.

In another aspect, the voice recognition system 755 may receive the audio data and determine that the audio is indicative of human speech. The control system 700 may cause the voice recognition system 755 to recognize the speech content in the audio data and evaluate the speech content for context that indicates an imminent need for a vehicle control action, such as stopping the vehicle, slowing down a velocity of the vehicle, steering the vehicle to a side of the road, etc.

The control system 700 may facilitate communication between the driver of the vehicle 705 and another driver. For example, another vehicle may pull up next to the vehicle 705, and the driver of the other vehicle may initiate an impromptu communication. The driver of the second vehicle may attempt to get the attention of the driver of the vehicle 705, perhaps by asking for directions with the hope that their voice is heard through the closed window of the vehicle 705. Although the driver, with windows up, music playing, etc., may not normally be able to hear the second driver's communication, the voice recognition system 755 may receive the speech input (sound) through the transducer 750, which may be attached to the automotive glass 760 of the vehicle 705, and determine, via the voice recognition system 755, that the speech content of the sound received from the transducer 750 correlates to a need to play an audio feed through the audio system of the vehicle 705. The control system 700 may output the voice signal by way of the communication interface 720 and/or the user interface device 710. In this example, although the window is up, a clear recreation of the individual's voice may sound through the vehicle sound system(s) such that the driver of the vehicle 705 can clearly hear the question being asked by the other driver.

In another example, an observer outside of the vehicle may notice that the vehicle operator has left an object (e.g., a cup of coffee) on the roof of the vehicle and has inadvertently begun to drive off with the cup of coffee on the roof. The observer may yell, "Driver! Your coffee is on the roof!" Although the driver may not be able to hear the verbal expression, the control system 700 may receive the audio data via the transducer 750, interpret the data to contextualize the speech content indicating "coffee on the roof," compare the context to a database indicative of actions correlated with particular phrases in context (e.g., "coffee on the roof" correlates to a need to slow down and stop the vehicle when safely able to do so), and issue vehicle control commands to the autonomous mode controller 735 based at least in part on the correlated action associated with the phrase that was contextualized by the voice recognition system.

The communication interface 720 may be configured or programmed to facilitate wired and/or wireless communication between the components of the vehicle 705 and other devices, such as a remote server or another vehicle when using a vehicle-to-vehicle communication protocol. The communication interface 720 may also be configured and/or programmed to communicate directly from the vehicle 705 to a mobile device using any number of communication protocols such as Bluetooth®, Bluetooth® Low Energy, or Wi-Fi.

A telematics transceiver 725 may include wireless transmission and communication hardware that may be disposed in communication with one or more transceivers associated with telecommunications towers and other wireless telecommunications infrastructure. For example, the telematics transceiver 725 may be configured and/or programmed to receive messages from, and transmit messages to one or more cellular towers associated with a telecommunication provider, and/or and a Telematics Service Delivery Network (SDN) associated with the vehicle 705. In some examples, the SDN may establish communication with a mobile device, which may be and/or include a cell phone, a tablet computer, a laptop computer, a key fob, or any other electronic device. An internet connected device such as a PC, Laptop, Notebook, or Wi-Fi connected mobile device, or another computing device may establish cellular communications with the telematics transceiver 725 through the SDN.

The communication interface 720 may also communicate using one or more vehicle-to-vehicle communications technologies. An example of a vehicle-to-vehicle communication protocol may include, for example, a dedicated short-range communication (DSRC) protocol. Accordingly, the communication interface 720 may be configured or programmed to receive messages from and/or transmit messages to a remote server and/or other autonomous, semi-autonomous, or manually-driven vehicles. In some aspects, the transducer 750 may generate a sound signal that is transmitted to another vehicle using the vehicle-to-vehicle communication protocol.

The autonomous driving sensors 730 may include any number of devices configured or programmed to generate signals that help navigate the vehicle 705 while the vehicle 705 is operating in the autonomous (e.g., driverless) mode. Examples of autonomous driving sensors 730 may include a radar sensor, a LIDAR sensor, a vision sensor, or the like. The autonomous driving sensors 730 may help the vehicle 705 "see" the roadway and the vehicle surroundings and/or negotiate various obstacles while the vehicle is operating in the autonomous mode.

The autonomous mode controller 735 may be configured or programmed to control one or more vehicle subsystems while the vehicle is operating in the autonomous mode. Examples of subsystems that may be controlled by the autonomous mode controller 735 may include one or more systems for controlling braking, ignition, steering, acceleration, transmission control, and/or other control mechanisms. The autonomous mode controller 735 may control the subsystems based, at least in part, on signals generated by the autonomous driving sensors 730. It is contemplated that the control system 700 may control one or more subsystems using information received from the transducer 750. Example information may include speech data as described above, vehicle sounds indicative of a mechanical failure or need for maintenance, emergency situations indicated by sounds such as, for example, a siren of an emergency vehicle, and other auditory input.

Figure 8A:
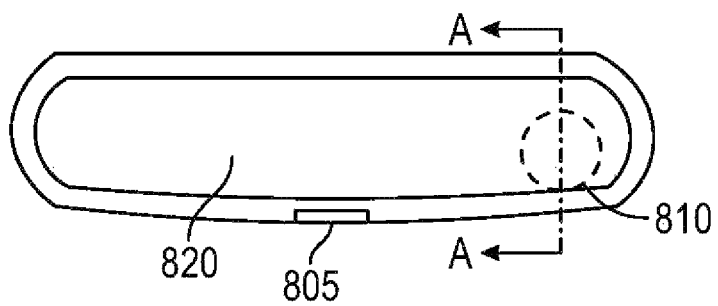
FIG. 8A is a front view of a rear-view mirror with a transducer assembly adhered to an inside surface of the mirror glass according to embodiments of the present disclosure.
Figure 8B:
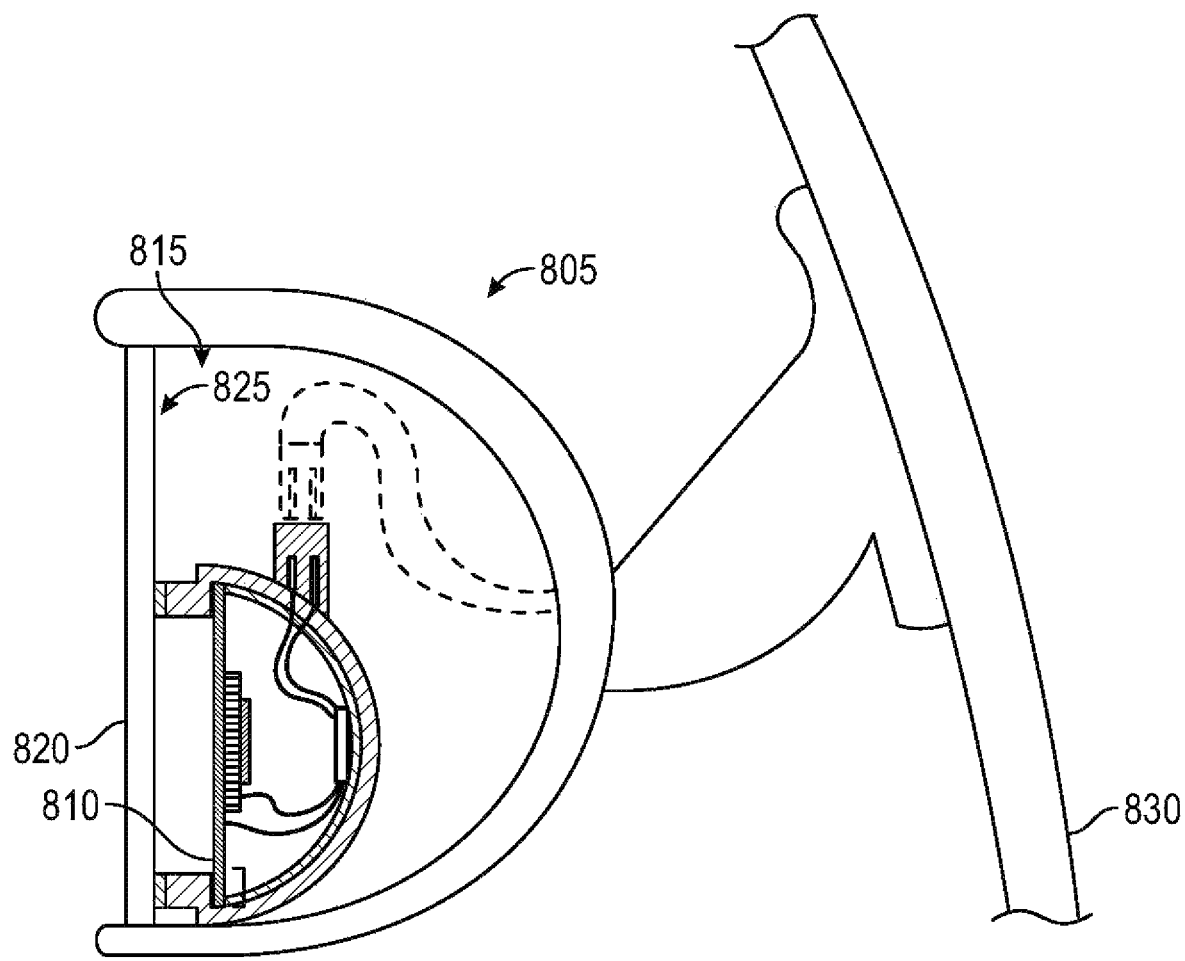
FIG. 8B is a partial section view of the rear-view mirror of FIG. 8A in accordance with embodiments of the present disclosure.

FIGS. 8A and 8B depict a front view of a rear-view mirror 805 and a partial section view of the rear-view mirror 805, respectively. The rear-view mirror 805 is configured with a piezoelectric diaphragm transducer 810 (hereafter "transducer assembly 810") that may receive vibrational input from the rear-view mirror glass 820 of the rear-view mirror 805, and produce a sound signal that may be used for various purposes. The transducer assembly 810 may be substantially similar or identical to the transducer assembly 100 as described with respect to FIG. 1.

The section view A-A as shown in FIG. 8B depicts the transducer assembly 810 on an interior portion 815 of the rear-view mirror 805. The transducer assembly 810 is depicted rigidly connected with an inside surface 825 of the rear-view mirror glass 820. In an example embodiment, the transducer assembly 810 may act as the sound input device for use on an interior surface of a vehicle (e.g., inside of a vehicle similar to the vehicle 705 as shown in FIG. 7) such that the transducer 810 may capture sound input through the glass 820, and transmit the sound input to a connected vehicle computer. The configuration as shown in FIGS. 8A and 8B may replace or supplement an interior microphone that is often configured inside the cabin of the vehicle (e.g., where the microphone is integrated with the rear-view mirror, the sun visor, or at another interior location).

Figure 9:
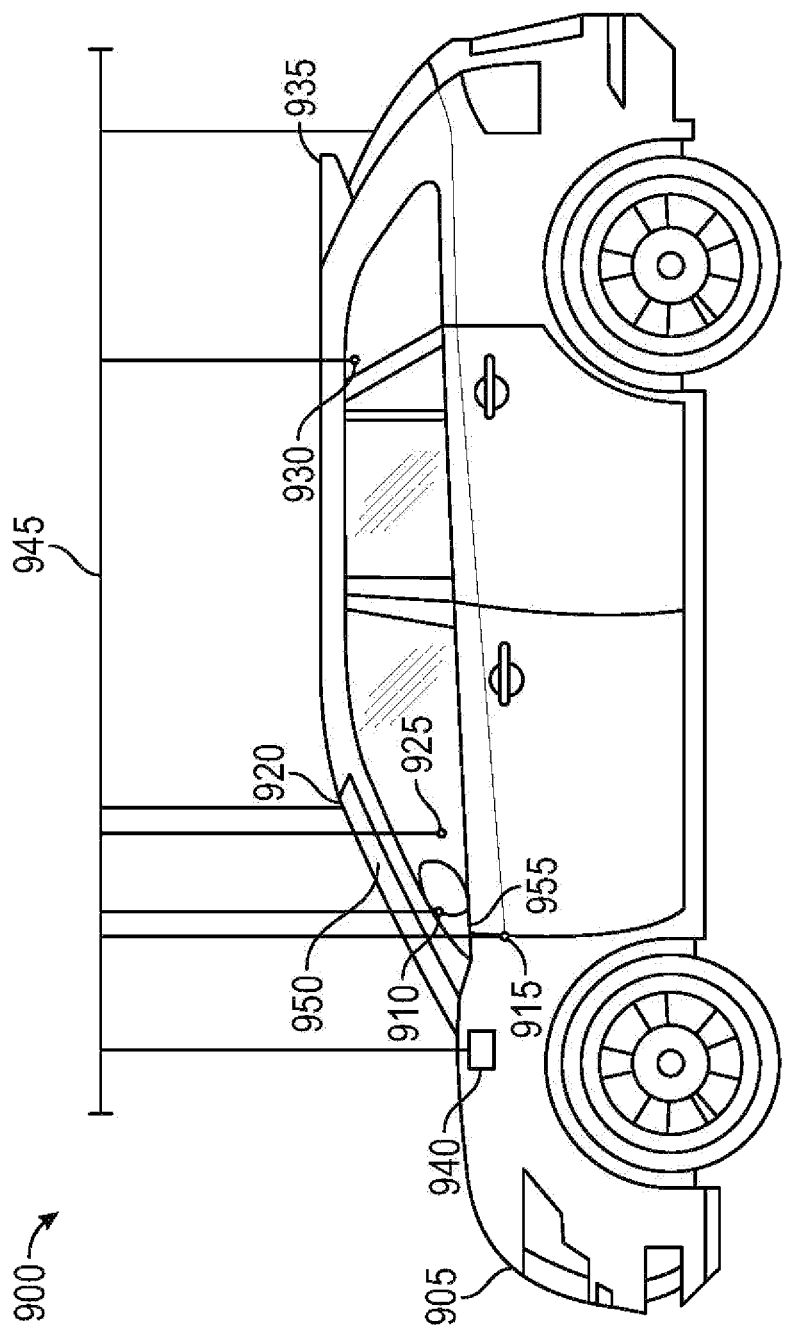
FIG. 9 depicts example transducer assemblies rigidly adhered to vehicle surfaces, according to example embodiments of the present disclosure.

In some aspects, the transducer assembly 810 may be installed on other non-glass surfaces of a vehicle. For example, FIG. 9 depicts a vehicle 905 having example transducer assemblies 910, 915, 920, 925, 930, and 935 rigidly adhered to various vehicle surfaces that provide various respective benefits as resonating surfaces. The transducer assemblies 910-935 may connect with and be disposed in communication with a vehicle control system 940 via a control bus 945. The control system 945 may be substantially similar or identical to the control system 700 described with respect to FIG. 7.

The vehicle control system 940, in some aspects, may connect with the transducer assembly 910, which may rigidly connect with an exterior surface of a vehicle windshield 950 beneath a window bezel 955. One advantage to placing the transducer assembly at a location on the windshield behind a bezel may include taking advantage of a large area of the resonating surface (e.g., the windshield 950), which may produce high quality sound signals that originate from a forward position with respect to the vehicle 905. Accordingly, the sound may resonate through the windshield, with which the transducer assembly 910 may generate an output signal.

The control system 905 may be disposed in electrical communication with the transducer assembly 925 configured on the rear-view mirror of the vehicle 905, which may provide means for sound pickup originating from the side or rear of the vehicle 905. Moreover, vocal communication from individuals standing outside of the vehicle 905 may be generally level with the transducer assemblies 910, 925, 930, 935, etc., such that voices are readily received by the resonating surfaces and transducer assemblies attached thereto.

Figure 10:
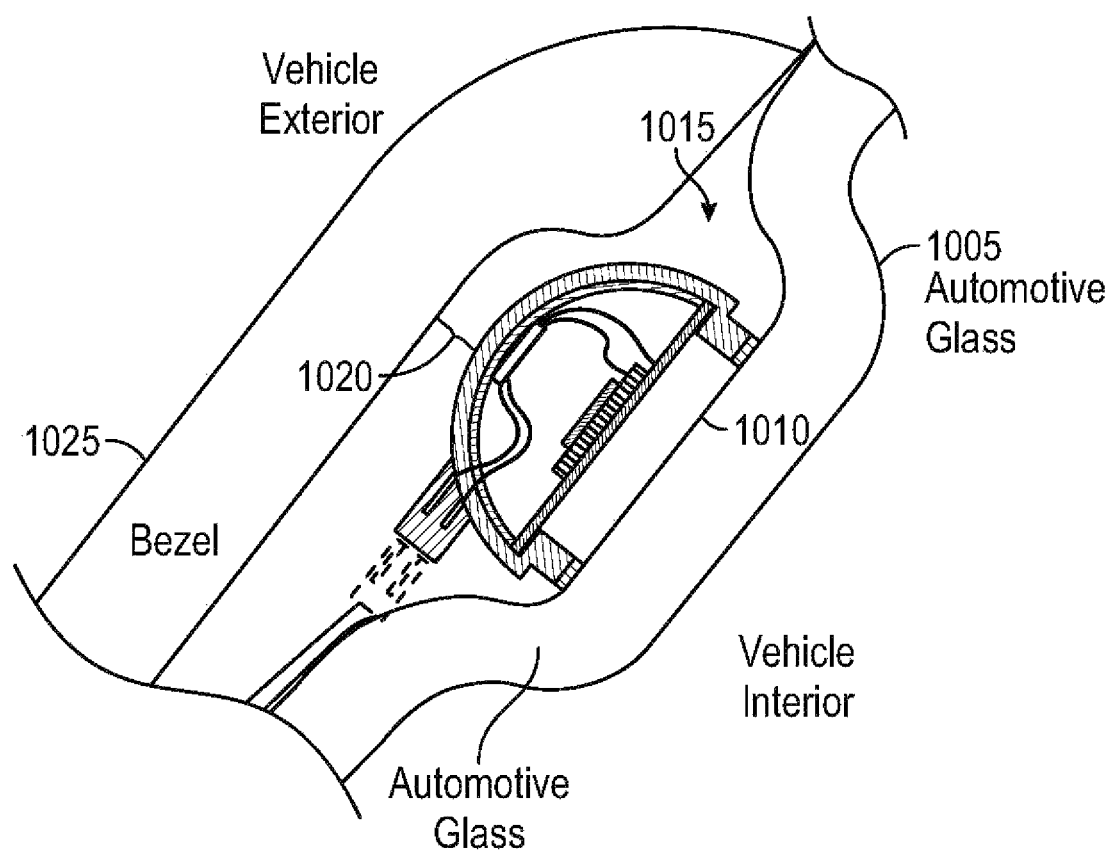
FIG. 10 shows a section view of one example configuration for attaching a transducer assembly to an exterior surface of automotive glass beneath a glass bezel of a vehicle, according to an embodiment of the present disclosure.

FIG. 10 shows a section view of one example configuration for attaching a transducer assembly 1015 to an exterior surface of automotive glass 1005 beneath a glass bezel 1025. The automotive glass 1005 may include an indexed recess 1010 forming a pocket for mounting the transducer assembly 1015. The indexed recess 1010 may provide clearance (e.g., clearance 1020) between surfaces of the transducer assembly 1015 and any other vehicle members adjacent to the assembly such as, for example, the glass bezel 1025. Producing clearance may mean that adjacent parts to the transducer assembly 1015 do not contact the transducer assembly 1015. By providing the recess 1010 in the automotive glass 1005, the transducer assembly 1015 may be installed at locations of the vehicle that may be out of sight from users and may protect the transducer assembly 1015 from the weather or physical damage due to bumping, etc. It should be appreciated, however, that among the many advantages of embodiments described herein, the transducer assembly 1015 (and other similar transducer assemblies described herein) may function as robust and weather resistant microphones that may be installed on vehicle exterior surfaces because they are generally unaffected by weather, dirt, etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    attaching a transducer assembly to a resonating surface of a vehicle, the transducer assembly comprising a piezoelectric assembly spaced apart from the resonating surface;
    receiving, by the piezoelectric assembly, a kinetic vibration resonating from the resonating surface; and
    generating, by the piezoelectric assembly, an electric output signal associated with the kinetic vibration.

2. The method of claim 1, further comprising forming an air gap by a spacer, the piezoelectric assembly, and the resonating surface.

3. The method of claim 2, wherein the spacer is annular.

4. The method of claim 1, wherein the piezoelectric assembly comprises a diaphragm, a piezoelectric disk disposed on the diaphragm, and a tunable mass disposed on the piezoelectric disk.

5. The method of claim 1, further comprising a printed circuit board in communication with the piezoelectric assembly.

6. The method of claim 5, wherein the printed circuit board comprises an amplification circuit and a bandpass filter, wherein the printed circuit board is configured to:
    receive, from the piezoelectric assembly, a signal;
    remove, by the bandpass filter, unwanted signal content;
    amplify, by the amplification circuit, the signal; and
    transmit the signal.

7. The method of claim 5, further comprising a harness terminal in communication with the printed circuit board.

* * * * *